US007513432B2

(12) United States Patent
Chang

(10) Patent No.: US 7,513,432 B2
(45) **Date of Patent: *Apr. 7, 2009**

(54) CARD DISPENSER ADJUSTABLE SUBJECT TO THE SIZE OF THE CARDS TO BE DISPENSED

(75) Inventor: Hung-Yi Chang, Chilung (TW)

(73) Assignee: International Currency Technologies Corporation, Taipei, Taipei Hsien (TW)

( * ) Notice: Subject to any disclaimer, the term of this patent is extended or adjusted under 35 U.S.C. 154(b) by 260 days.

This patent is subject to a terminal disclaimer.

(21) Appl. No.: 11/483,529

(22) Filed: Jul. 11, 2006

(65) Prior Publication Data

US 2008/0011832 A1 Jan. 17, 2008

(51) Int. Cl.
*G06K 7/00* (2006.01)
*G07F 19/00* (2006.01)

(52) U.S. Cl. ...................................... 235/486; 235/379

(58) Field of Classification Search ................. 235/379, 235/486; 902/8; 271/171
See application file for complete search history.

(56) References Cited

U.S. PATENT DOCUMENTS 6,267,370 B1 * 7/2001 Ito et al. ..................... 271/138
6,592,118 B2 * 7/2003 Youn .......................... 271/147
6,637,647 B2 * 10/2003 Katou et al. ................ 235/379
7,309,005 B2 * 12/2007 Washington et al. ........ 235/379
2005/0184444 A1 * 8/2005 An .......................... 271/10.03
2007/0267488 A1 * 11/2007 Chang ........................ 235/381

* cited by examiner

*Primary Examiner*—Thien M. Le
*Assistant Examiner*—April A Taylor
(74) *Attorney, Agent, or Firm*—Bacon & Thomas, PLLC

(57) ABSTRACT

A card dispenser includes a dispenser body, which has an accommodation chamber for receiving a stack of cards for dispensing, an output port, and a delivery path connected between the accommodation chamber and the output port, a conveying unit controllable to deliver the cards from the accommodation chamber through the delivery path to the output port individually, an adjustment structure for adjusting the length and width of the accommodation chamber subject to the size of the loaded cards, a base member detachably mounted in the dispenser body and provided with an adjustment device for adjusting a gap of the delivery path subject to the thickness of the cards in the accommodation chamber, and detection devices respectively mounted in the dispenser body and the base member for detecting accurate dispensing of every card through the delivery path to the output port.

13 Claims, 13 Drawing Sheets

CARD DISPENSER ADJUSTABLE SUBJECT TO THE SIZE OF THE CARDS TO BE DISPENSED

BACKGROUND OF THE INVENTION

1. Field of the Invention

The present invention relates to automatic vending machines and more specifically, to a card dispenser for automatic vending machine, which is adjustable subject to the size of the cards to be dispensed and, which greatly saves the manufacturing cost and the inventory cost.

2. Description of the Related Art

Following fast development of information technology, non-shop business has become popular. Nowadays, various automatic vending machines are used everywhere to sell different products without servicemen. These automatic vending machines bring convenience to consumers and create new marketing routes for the suppliers.

Further, an automatic vending machine has an exchanger on the inside for providing different products to the user after having received a bill. Following fast development of high technology, various advanced automatic vending machines such as ticket venders, bill exchangers, coin exchangers, and etc., have been continuously created and appeared in different public places or street corners. Different sizes of bill exchangers or card/ticket vending machines are respectively equipped with a different size of bill or card dispenser. Further, different specifications of bill or card dispensers may be prepared to fit different sizes of bills or cards. Preparing different specifications of bill or card dispensers in order to fit different sizes of bills or cards greatly increases the material and manufacturing cost as well the inventory cost.

Further, after a long use of a bill or card dispenser, the authentification device of the bill or card dispenser tends to be contaminated by the dirt carried on the dispensed bills or cards or covered with dust in air, thereby lowering the detection accuracy or resulting in an error action. Further, a bill or card dispenser may be unable to function normally when a wrinkled bill or card jammed in it. When the aforesaid conditions occurred, the bill or card dispenser the must be removed from the bill exchanger or card/ticket vending machine for a replacement or repair. However, because a number of screws are used to affix the bill or card dispenser to the housing of the bill exchanger or card/ticket vending machine, it is complicated to dismount the bill or card dispenser. During the dismounting work, the worker must pick up every unfastened screw carefully because the loss of one screw results uninstallability of the bill or card dispenser.

Therefore, it is desirable to provide a modularized card (or bill or ticket) dispenser that eliminates the aforesaid various drawbacks of the conventional designs.

SUMMARY OF THE INVENTION

The present invention has been accomplished under the circumstances in view. According to one aspect of the present invention, the card dispenser comprises a dispenser body, and a base member mounted in the dispenser body. The dispenser body has an accommodation chamber for receiving a stack of cards for dispensing, an output port, a delivery path in communication between the accommodation chamber and the output port, and a conveying unit controlled to deliver the loaded cards from the accommodation chamber through the delivery path to the output port individually. Further, the dispenser body has an adjustment structure for adjusting the length and width of the accommodation chamber subject to the length and width of the cards to be dispensed. Therefore, the card dispenser is practical for use to dispense different sizes of cards, notes, tickets, etc.

According to another aspect of the present invention, the base member is detachably inserted into the card dispenser. Further, detection devices are respectively mounted in the dispenser body and the base member for detecting accurate dispensing of every card through the delivery path to the output port. After a long use of the card dispenser, the user can conveniently take the base member out of the dispenser body for cleaning. When a wrinkled card jammed in the delivery path, the user can take the base member out of the dispenser body conveniently and then remove the jammed card.

According to still another aspect of the present invention, the base member has an adjustment device for adjusting the pressure to a roller in the delivery path to further adjust a gap of the delivery path of the dispenser body subject to the thickness of the cards to be dispensed.

DETAILED DESCRIPTION OF THE PREFERRED EMBODIMENT

Figure 1:
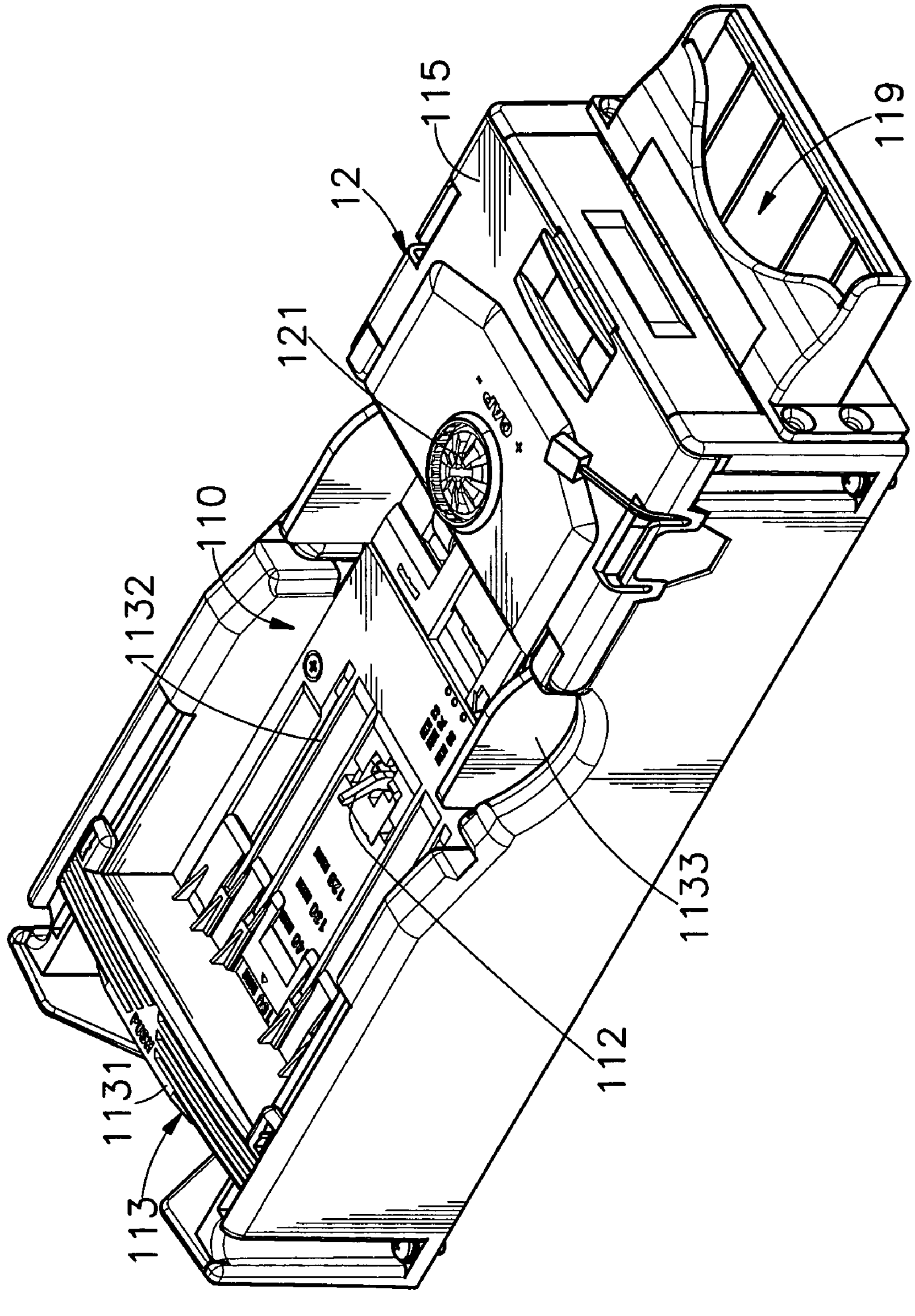
FIG. 1 is a perspective view of a card dispenser in accordance with the present invention.

Referring to FIGS. 1, 2, 2A, 2B, and 2C, a card dispensers in accordance with the present invention is shown comprised of a dispenser body 11 and a base member 12.

The dispenser body 11 has an accommodation chamber 110 adapted to accommodate cards (or tickets or notes) 2, a pressure board 111 for holding down cards 2 in the accommodation chamber 10, a card sensor 112 mounted inside the accommodation chamber 110 and adapted to detect the presence of card or cards 2, an adjustment structure 113 adapted to adjust the length and width of the accommodation chamber 110 subject to the size of the cards 2 to be received, a conveying unit 114 provided in the accommodation chamber 110 at one side, a cover plate 115 provided in the accommodation chamber 110 adjacent to the conveyer unit 114, a delivery path 116 defined in the accommodation chamber 110 at one side, at least one roller 117 and one detection device 118 arranged in the delivery path 116. The conveying unit 114 comprises a motor 1141, a transmission gear set 1142, and a plurality of wheels 1143. The wheels 1143 each have a push block 1144 fixedly provided at the periphery. The detection device 18 comprises first lenses 1181 and second lenses 1182. The delivery path 116 has an output port 119.

The base member 12 comprises a rotary adjustment device 121, which has a press portion 1211 for pressing on the roller 117 in the delivery path 116 to adjust a gap of the delivery path 116, two actuating wheels 122 arranged in parallel at two sides, and a detection device 123. The detection device 123 comprises a first sensor 1231 corresponding to the first lens 1181, and a second sensor 1232 corresponding to the second lens 1182.

Figure 2:
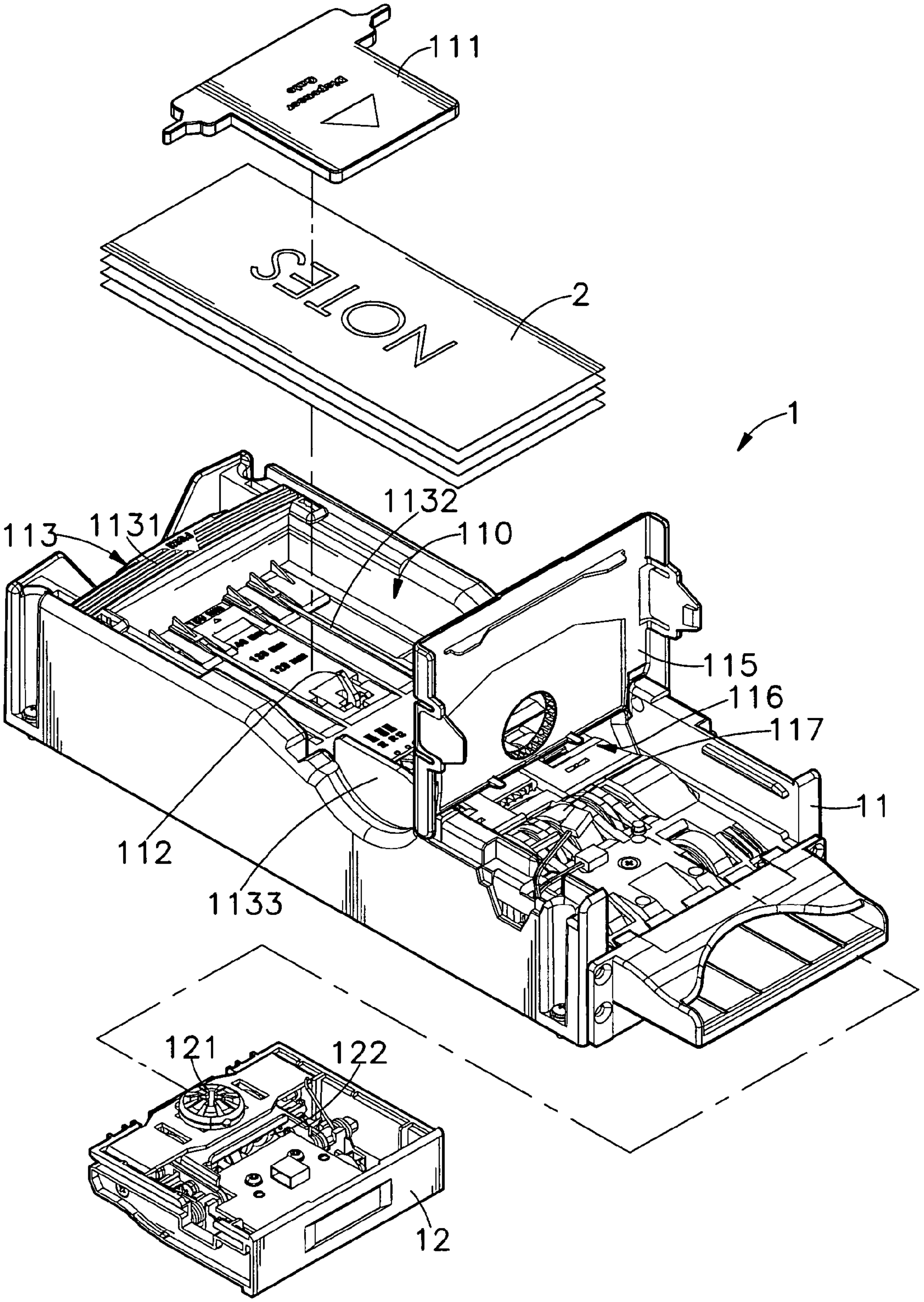
FIG. 2 is an exploded view of the card dispenser according to the present invention.
Figure 2A:
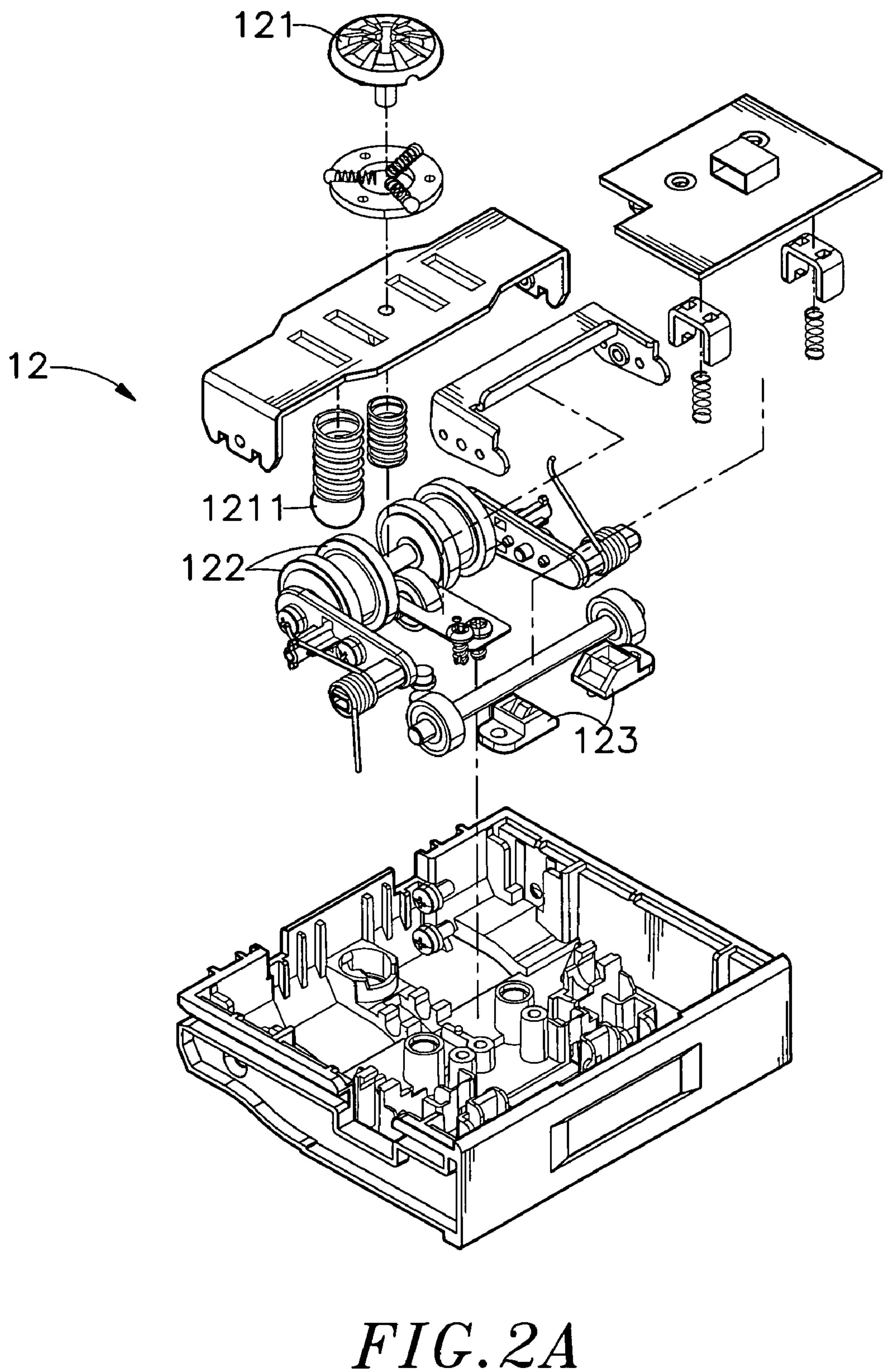
FIG. 2A is an exploded view of the base member of the card dispenser according to the present invention.
Figure 2B:
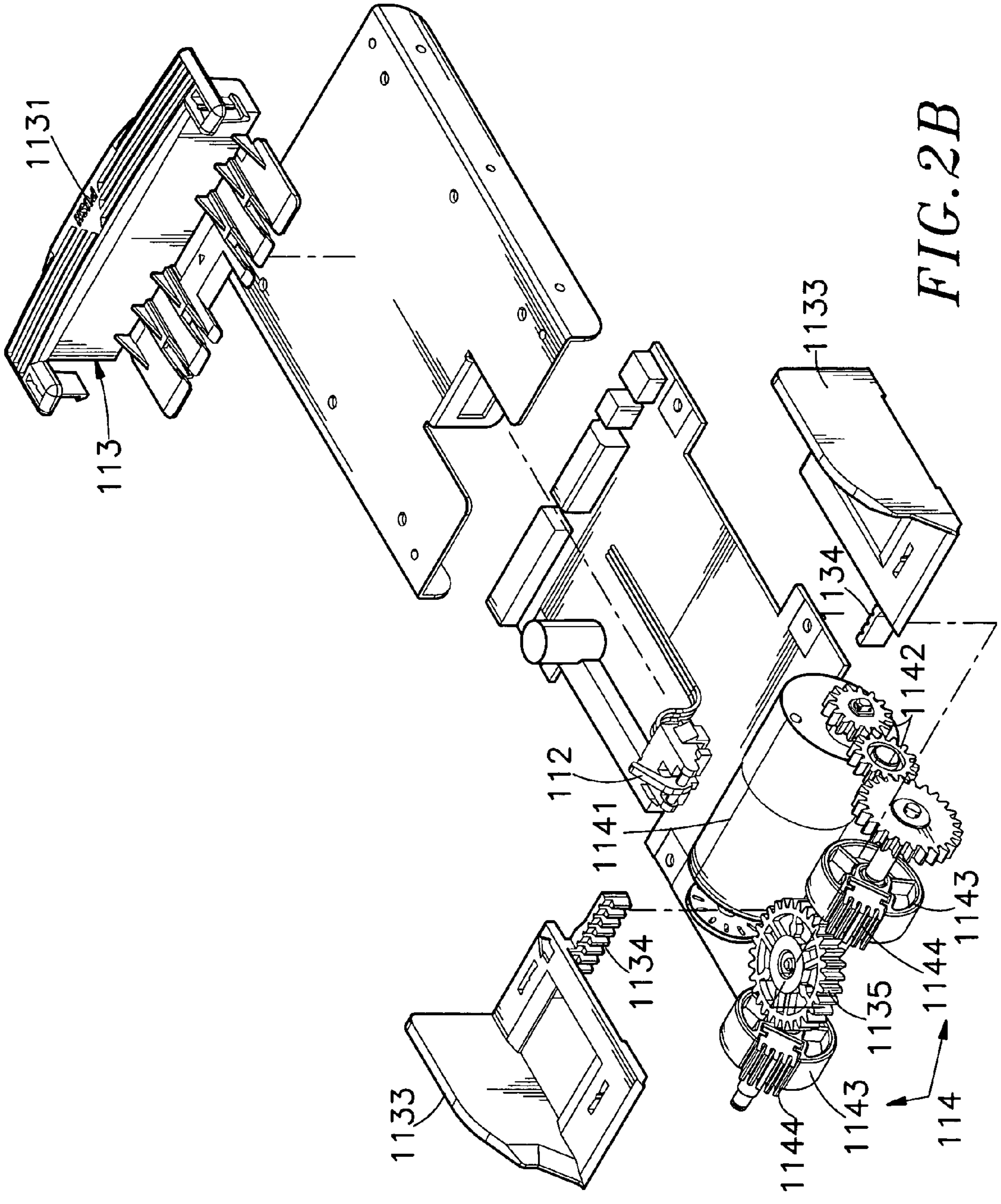
FIG. 2B is an exploded view of the dispenser body of the card dispenser according to the present invention.
Figure 3A:
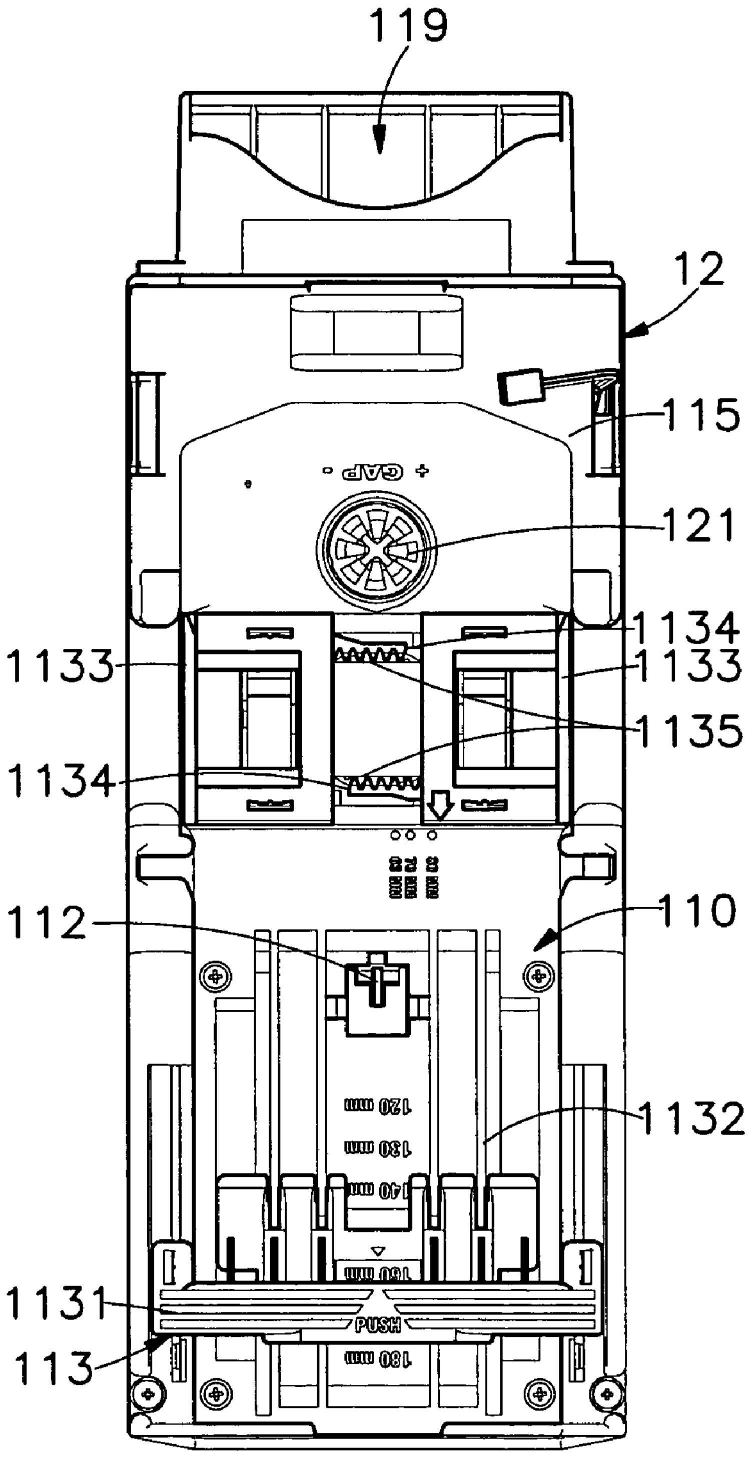
FIG. 3A is a schematic top view of the present invention, showing the adjustment operation of the accommodation chamber of the dispenser body (I).
Figure 3B:
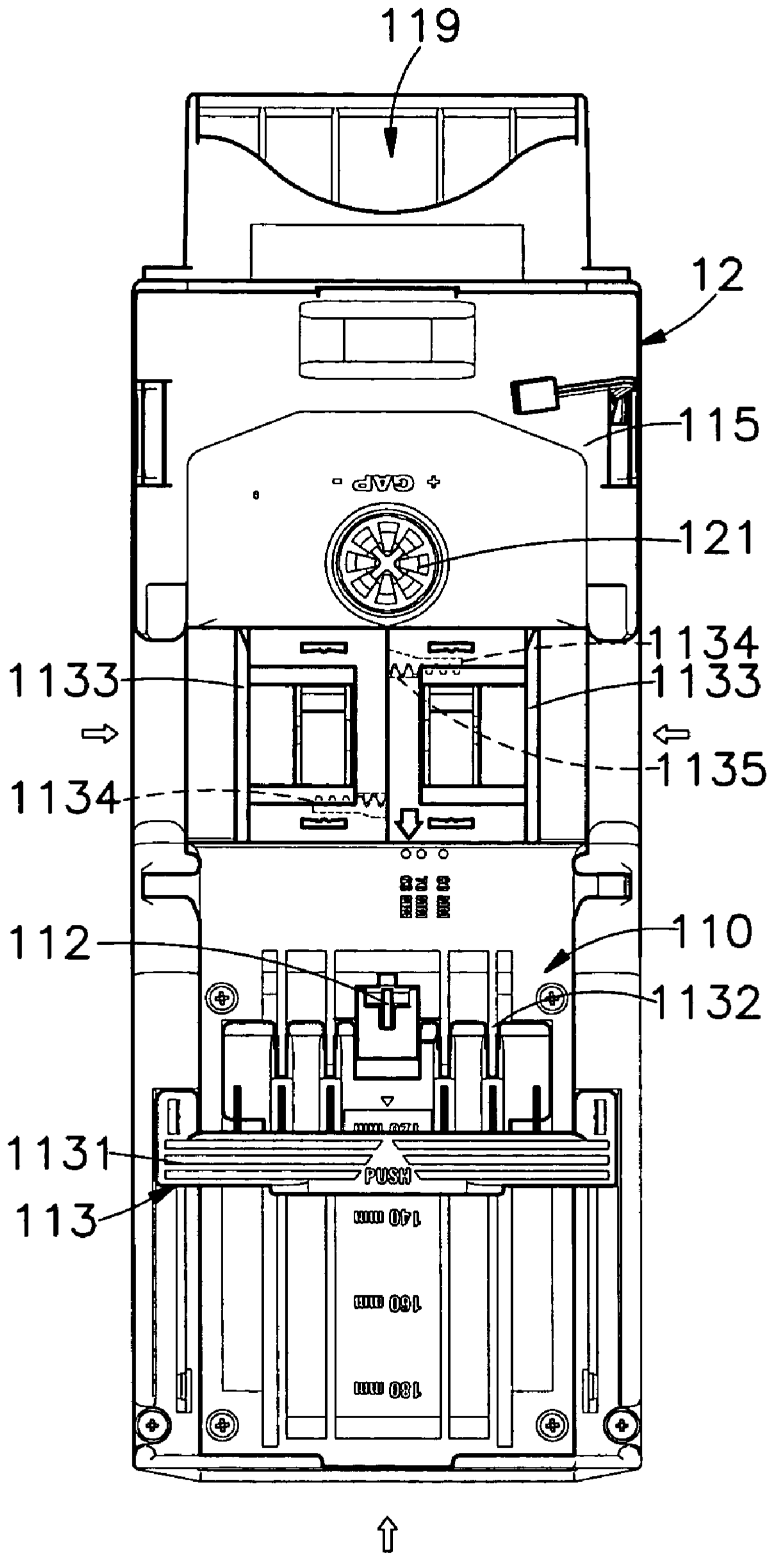
FIG. 3B is a schematic top view of the present invention, showing the adjustment operation of the accommodation chamber of the dispenser body (II).

Referring to FIGS. 2B, 3A and 3B, the adjustment structure 113 is mounted in the accommodation chamber 110 and adjusted subject to the size of the cards 2, keeping the cards 2 between the adjustment structure 113 and the delivery path 116. The adjustment structure 113 comprises a track 1132 fixedly mounted inside the accommodation chamber 110, a length adjustment plate member 1131 mounted on the track 1132 and movable along the track 1132 to adjust the length of the accommodation chamber 110 subject to the length of the cards 2, at least one, for example, two width adjustment plate members 1133 arranged at two opposite lateral sides, each width adjustment plate member 1133 having a rack 1134 and a driving gear 1135 meshed with the rack 1134. When rotating the driving gear 1135, each width adjustment plate member 1133 is moved with the respective rack 1134, and therefore the width of the accommodation chamber 110 is relatively adjusted. According to the present preferred embodiment, the adjustment structure 113 comprises two width adjustment plate members 1133 that are movable relative to each other to adjust the width of the accommodation chamber 110 subject to the width of the cards 2. Alternatively, the adjustment structure 113 can be made having only one width adjustment plate member 1133 transversely movable in the accommodation chamber 110 at one side to adjust the width of the accommodation chamber 110 subject to the width of the cards 2. Therefore, the card dispenser 1 is practical for use to dispense cards, tickets, or notes of different sizes.

Figure 4A:
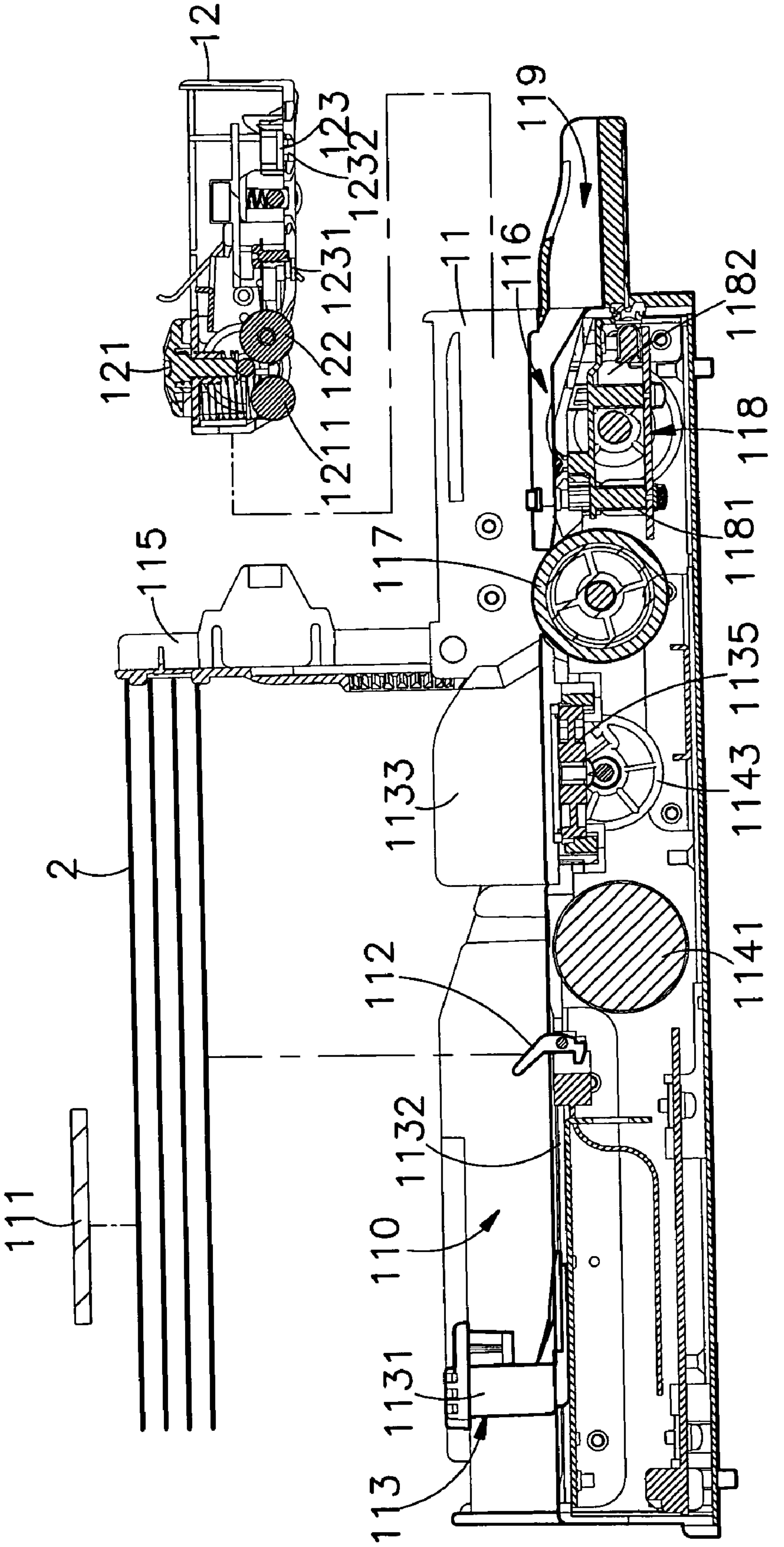
FIG. 4A is a schematic side view showing horizontal installation of the base member in the dispenser body.
Figure 4B:
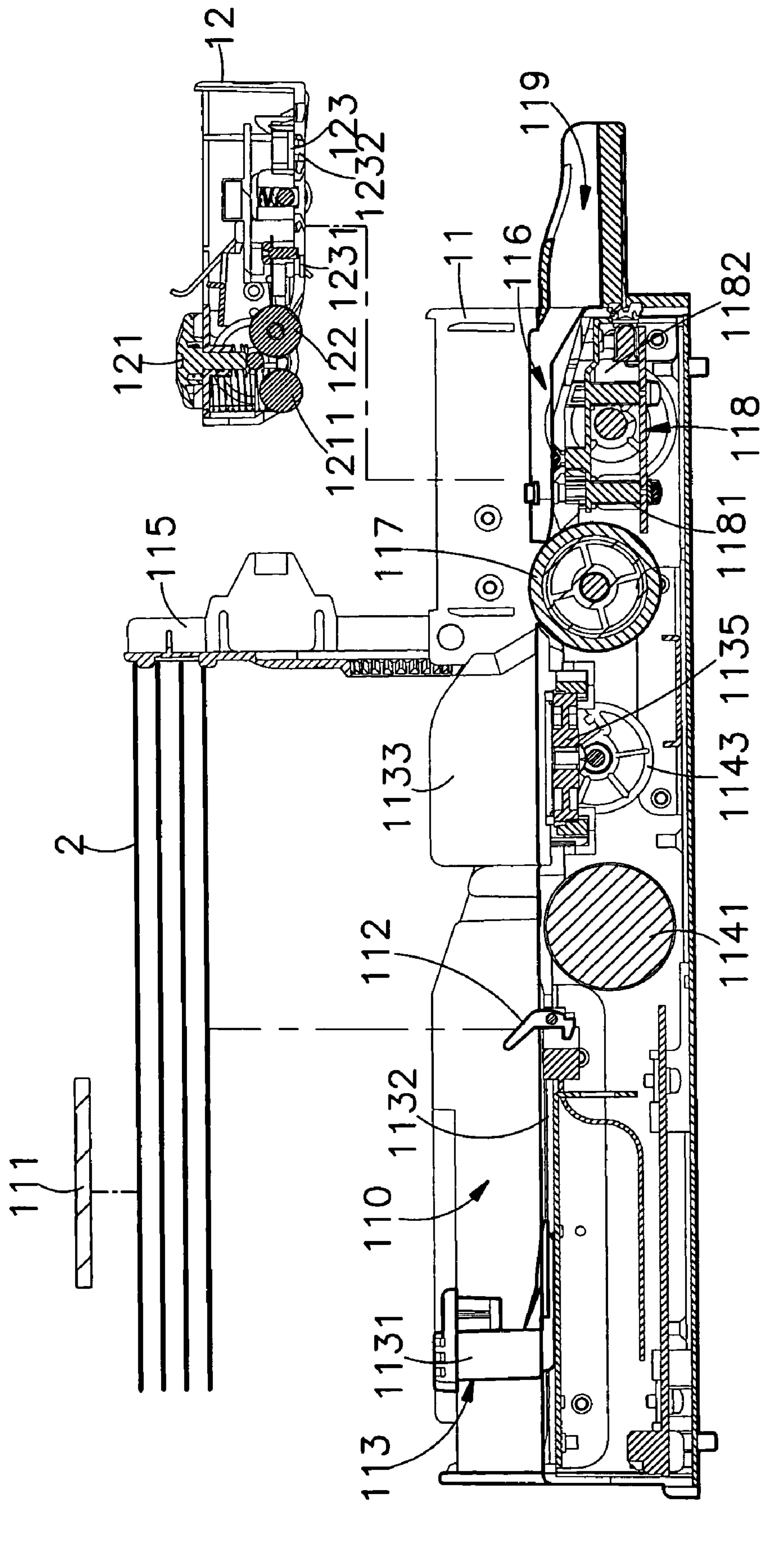
FIG. 4B a schematic side view showing vertical installation of the base member in the dispenser body.

Referring to FIGS. 4A and 4B, the base member 12 is positioned in the dispenser body 11 by means of positioning means. After installation of the base member 12 in the dispenser body 11, the cover plate 115 is covered on the base member 12. Further, the base member 12 can be inserted into the dispenser body 11 or pulled out of the dispenser body 11 in horizontal direction. When one card 2 is wrinkled and jammed in the card dispenser 1, a user can directly and conveniently remove the base member 12 out of dispenser body 11 to eliminate the trouble. Further, if the base member 12 failed, the user can also directly and conveniently remove the base member 12 out of the dispenser body 11 for repair or replacement.

Figure 5A:
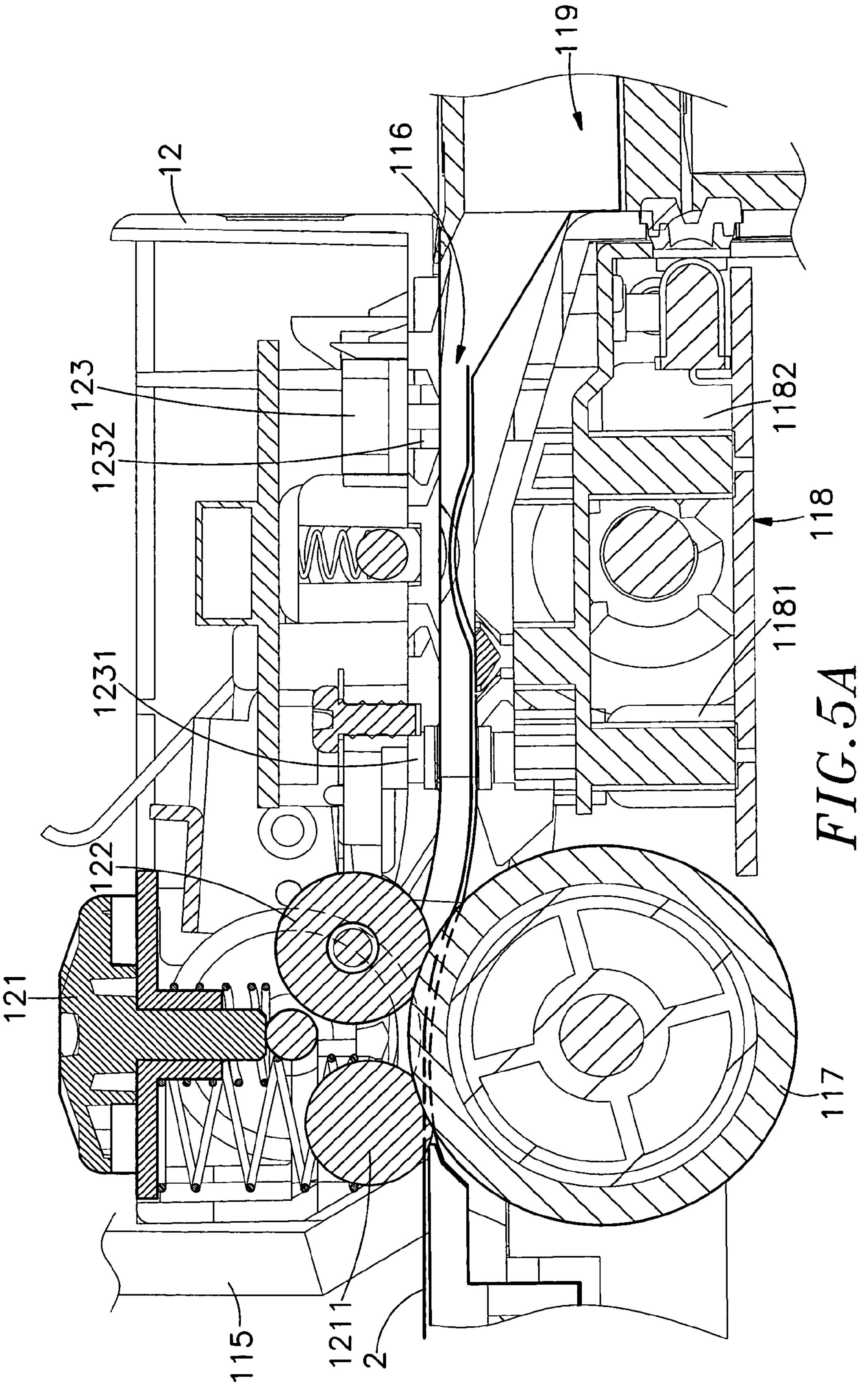
FIG. 5A is a schematic sectional view showing the adjustment of the gap of the delivery path according to the present invention (I).
Figure 5B:
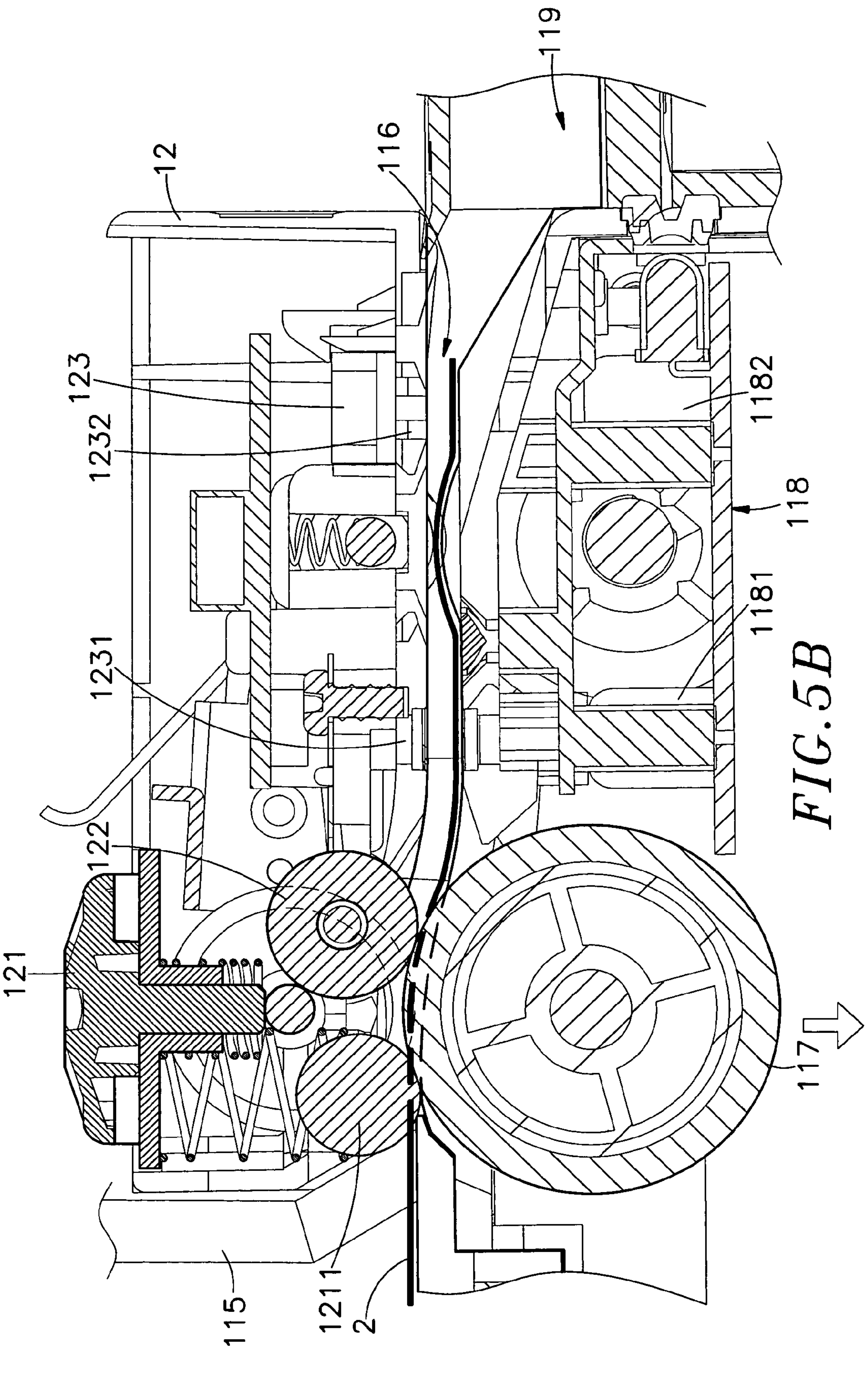
FIG. 5B is a schematic sectional view showing the adjustment of the gap of the delivery path according to the present invention (I).

Referring to FIGS. 2, 5A and 5B, after loading of a stack of cards 2 in the accommodation chamber 110, the gap of the delivery path 116 is adjusted subject to the thickness of the cards 2 so that the cards 2 can be individually and smoothly delivered through the delivery path 116 out of the output port 119. When making an adjustment on the gap of the delivery path 116, rotate the rotary adjustment device 121 to press the press portion 1211 against the roller 117 in the delivery path 116 and to further control the gap of the delivery path 116. By means of rotating the rotary adjustment device 121 to control the pressure of the press portion 1211 against the roller 117, the gap of the delivery path 116 is relatively adjusted.

Figure 2C:
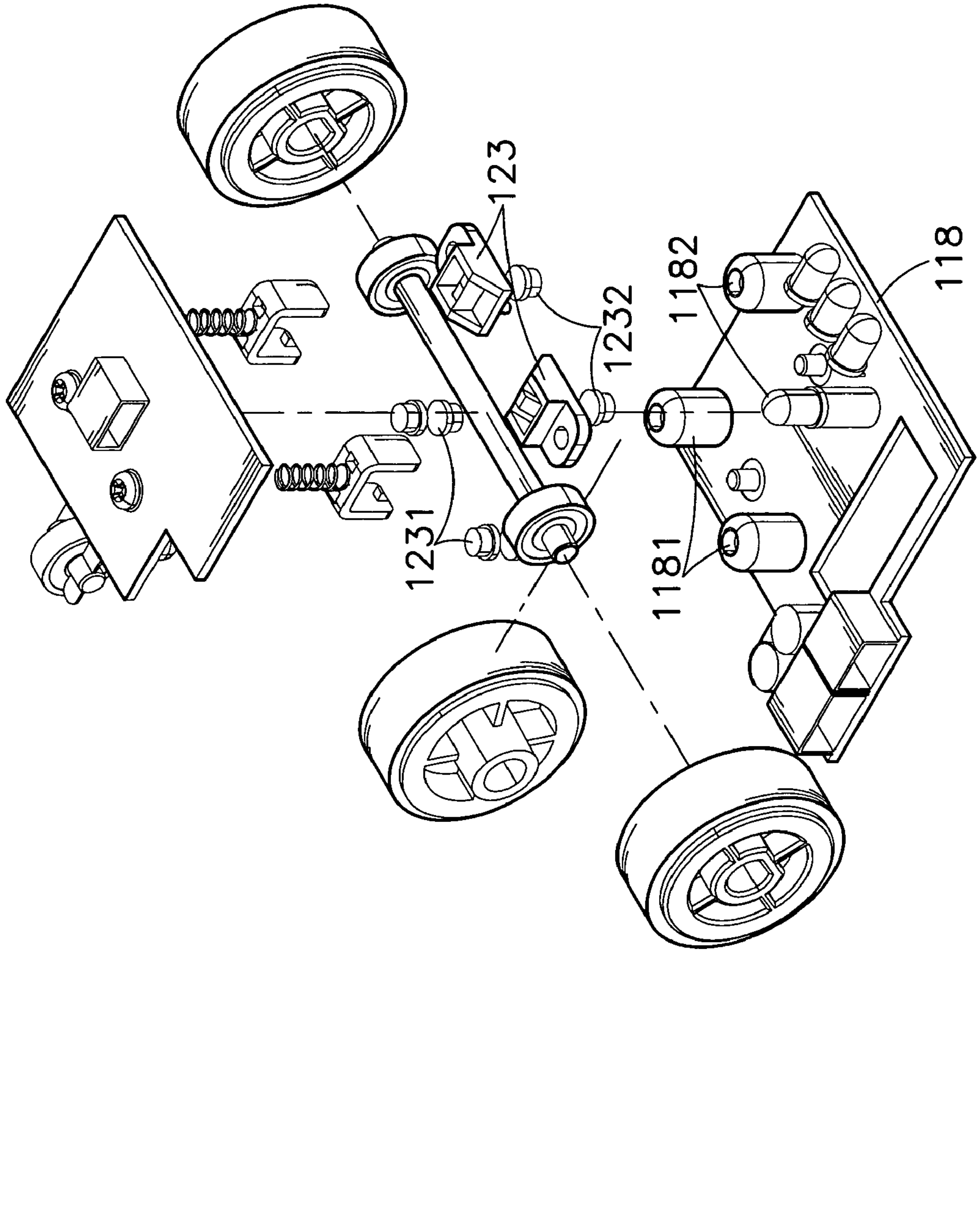
FIG. 2C is an exploded view of a part of the card dispenser according to the present invention, showing the structure of the detection device of the base member and the detection device of the dispenser body.
Figure 6A:
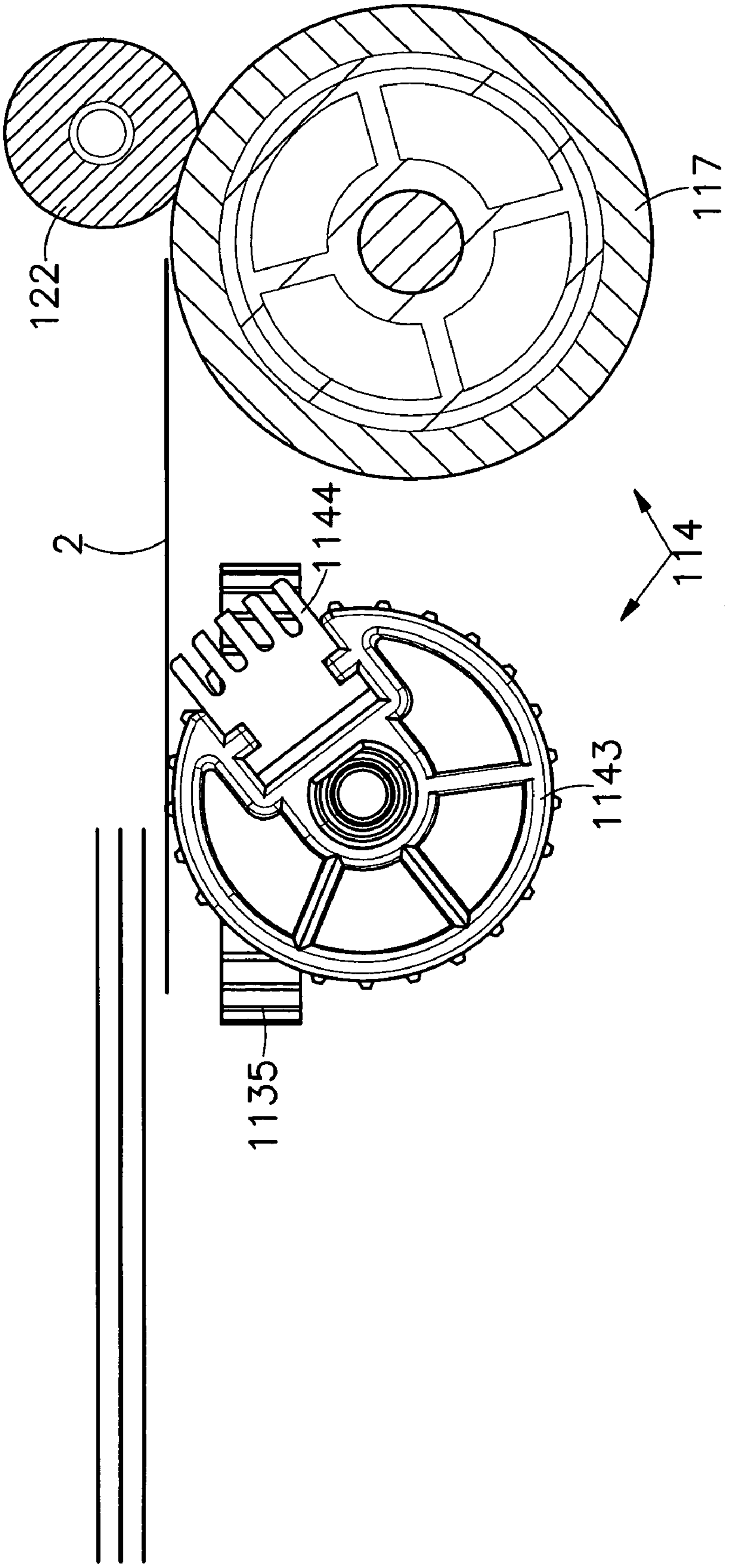
FIG. 6A is a schematic sectional view showing the card delivery action of the card dispenser according to the present invention (I).
Figure 6B:
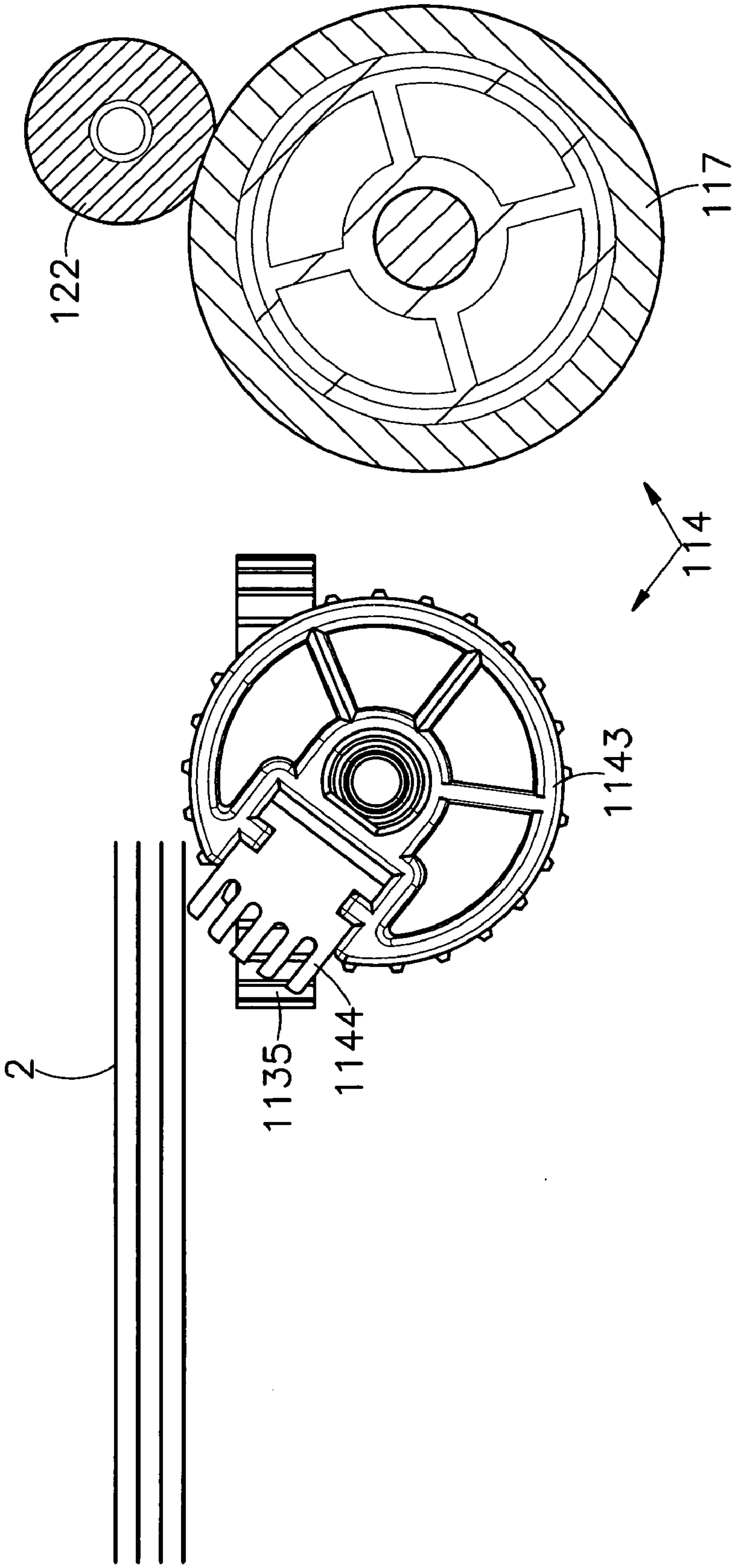
FIG. 6B is a schematic sectional view showing the card delivery action of the card dispenser according to the present invention (II).

Referring to FIGS. 2C, 6A and 6B, after loading of a stack of cards 2 in the accommodation chamber 110 of the dispenser body 11, the card sensor 112 is induced by the cards 2 to output a signal to a control circuit of an automatic vending machine (not shown) so that the control circuit of the automatic vending machine can control the card dispenser 1 to dispense the cards 2. When starting a card dispensing operation, the motor 1141 is driven to rotate the transmission gear set 1142 and the wheels 1143, thereby causing the push blocks 1144 of the wheels 1143 to touch the cards 2 and to further push the cards 2 toward the actuating wheels 122. When the cards 2 touched the actuating wheels 122, the cards 2 are forced by the actuating wheels 122 into a stepped status, for enabling the push blocks 1144 of the wheels 1143 to push the lowest card 2 into the delivery path 116 toward the output port 119 of the dispenser body 11. When one card 2 is pushed out of the output port 119 of the dispenser body 11, the first sensor 1231 and the first lens 1181 detect the quantity of the card 2 been dispensed; the second sensor 1232 and the second lens 1182 detect completion of the dispensing work. After each card dispensing operation, the second sensor 1232 outputs a signal indicative of the completion of the dispensing work. Therefore, the card dispenser 1 accurately sends out the cards 2 through the output port 119 without causing any loss.

Further, the aforesaid adjustment device 121 can be an adjustment screw or control valve that matches with the roller 117 to control the gap of the delivery path 116 subject to the thickness of the cards 2 so that the cards 2 can be individually and accurately delivered out of the output port 119. Further, the cards 2 can be any of a variety of valuable notes, sports player cards, game cards, telephone cards, valuable or invaluable cards, or the like.

As indicated above, the invention provides a card dispenser that has the following benefits:

1. By means of the adjustment structure 113, the user can adjust the length and width of the accommodation chamber 110 to fit different types of cards 2, enhancing the applicability of the card dispenser 1 and saving much the manufacturing cost of the vending machines and the inventory cost machine parts.

2. The user can conveniently remove the base member 12 from the dispenser body 11 for cleaning, preventing a detection failure due to accumulation of dirt. When a wrinkled card 2 is jammed in the card dispenser 1, the user can take the base member 12 out of the dispenser body 11 to eliminate the trouble. Further, the user can conveniently remove the base member 12 out of the dispenser body 11 for a replacement or repair work.

3. By means of adjusting the pressure of the press portion 1211 of the rotary adjustment device 121 against the roller 117 in the delivery path 116, the gap of the delivery path 116 is adjusted to fit different thickness of cards 2, enabling the loaded cards 2 to be accurately and individually delivered out of the output port 119.

4. Detection devices 118 and 123 are respectively provided in the dispenser body 11 and the base member 12 to detect the quantity of card 2 being delivered through the delivery path 116 and to detect the completion of the delivery of every card 2, assuring accurate dispensing operation of the card dispenser and preventing unnecessary loss.

A prototype of card dispenser has been constructed with the features of FIGS. 1~6. The card dispenser functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A card dispenser, comprising:

a dispenser body, said dispenser body having an accommodation chamber adapted to accommodate card members in a stack, an output port, a delivery path extending from one side of said accommodation chamber to said output port, and a conveying unit adapted to deliver the loaded card members from said accommodation chamber through said delivery path to said output port individually;

a base member mounted in one side of said dispenser body; and detection means installed in said dispenser body and said base member and adapted to detect dispensing of the loaded card members through said delivery path, wherein said dispenser body comprises an adjustment structure adapted to adjust the size of said accommodation chamber subject to the size of the cards to be dispensed, the adjustment structure having a length adjustment plate member mounted inside said accommodation chamber and movable to adjust the length of said accommodation chamber, and at least one width adjustment plate member mounted inside said accommodation chamber and movable to adjust the width of said accommodation chamber, each width adjustment plate having a rack and a driving gear meshed with said rack for adjusting the width of said accommodation chamber.

2. The card dispenser as claimed in claim 1, wherein said card members are at least one of bills, security notes, tickets and cards.

3. The card dispenser as claimed in claim 1, wherein said conveying unit comprises a motor, a transmission gear set coupled to and rotatable by said motor, and at least one wheel respectively coupled and rotatable by said transmission gear set, the at least one wheel each having a push block at the periphery thereof.

4. The card dispenser as claimed in claim 1, wherein said base member comprises adjustment means adapted to adjust a gap of said delivery path subject to the thickness of the card members to be dispensed.

5. The card dispenser as claimed in claim 4, wherein the adjustment means of said base member is an adjustment screw.

6. The card dispenser as claimed in claim 4, wherein the adjustment means of said base member is a control valve.

7. The card dispenser as claimed in claim 4, wherein the adjustment means of said base member comprises a press portion adapted to adjust the pressure to a roller in said delivery path and to further adjust the gap of said delivery path.

8. The card dispenser as claimed in claim 1, wherein said detection means are adapted to detect the quantity of the card member passing through said delivery path.

9. The card dispenser as claimed in claim 1, wherein said detection means are adapted to output a signal upon delivery of one card member out of said output port.

10. The card dispenser as claimed in claim 1, further comprising a card sensor mounted in said accommodation chamber of said dispenser body and adapted to detect the presence of the card members in said-accommodation chamber.

11. The card dispenser as claimed in claim 1, wherein said dispenser body comprises a pressure board adapted to hold down the loaded card members in said accommodation chamber.

12. The card dispenser as claimed in claim 1, wherein said dispenser body comprises a cover plate adapted to cover said base member.

13. The card dispenser as claimed in claim 1, wherein said adjustment structure of said dispenser body is mounted in said accommodation chamber in such a position that the loaded card members are held in between said adjustment structure and said delivery path for delivery to said output port though said delivery path by said conveying unit.

* * * * *